United States Patent
Basham et al.

(10) Patent No.: US 11,144,400 B2
(45) Date of Patent: *Oct. 12, 2021

(54) EFFICIENT MANAGEMENT OF POINT IN TIME COPIES OF DATA IN OBJECT STORAGE BY SENDING THE POINT IN TIME COPIES, AND A DIRECTIVE FOR MANIPULATING THE POINT IN TIME COPIES, TO THE OBJECT STORAGE

(71) Applicant: International Business Machines Corporation, Armonk, NY (US)

(72) Inventors: Robert B. Basham, Aloha, OR (US); Joseph W. Dain, Vail, AZ (US); Matthew J. Fairhurst, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/735,513

(22) Filed: Jan. 6, 2020

(65) Prior Publication Data
US 2020/0142779 A1 May 7, 2020

Related U.S. Application Data

(63) Continuation of application No. 14/863,086, filed on Sep. 23, 2015, now Pat. No. 10,572,347.

(51) Int. Cl.
*G06F 12/00* (2006.01)
*G06F 11/14* (2006.01)
*G06F 3/06* (2006.01)

(52) U.S. Cl.
CPC .......... *G06F 11/1451* (2013.01); *G06F 3/065* (2013.01); *G06F 3/067* (2013.01);
(Continued)

(58) Field of Classification Search
CPC .. G06F 11/1451; G06F 11/14; G06F 11/1435; G06F 3/067; G06F 3/0619; G06F 3/065; G06F 2201/84
(Continued)

(56) References Cited

U.S. PATENT DOCUMENTS

| 9,348,702 B2 | 5/2016 | Hsu et al. |
| 10,572,347 B2 | 2/2020 | Basham et al. |

(Continued)

FOREIGN PATENT DOCUMENTS

| EP | 2491486 A1 | 8/2012 |
| WO | 2011049840 A1 | 4/2011 |
| WO | 2011130588 A2 | 10/2011 |

OTHER PUBLICATIONS

Mell et al., "The NIST Definition of Cloud Computing," NIST Special Publication 800-145, Sep. 2011, 7 pages.

(Continued)

*Primary Examiner* — Mardochee Chery
(74) *Attorney, Agent, or Firm* — Zilka-Kotab, P.C.

(57) ABSTRACT

A computer program product, according to one embodiment, is for managing point in time copies of data in object storage. The computer program product includes a computer readable storage medium having program instructions embodied therewith. Moreover, the program instructions executable by a processor to cause the processor to: create, by the processor, point in time copies of data, and send, by the processor, the point in time copies of the data to an object storage system. A directive for manipulating the point in time copies of the data is also sent by the processor to the object storage system.

19 Claims, 4 Drawing Sheets

(52) U.S. Cl.
CPC ............ *G06F 3/0619* (2013.01); *G06F 11/14* (2013.01); *G06F 11/1435* (2013.01); *G06F 2201/84* (2013.01)

(58) Field of Classification Search
USPC ........................................................ 711/162
See application file for complete search history.

(56) References Cited

U.S. PATENT DOCUMENTS

| | | |
|---|---|---|
| 2003/0005235 A1 | 1/2003 | Young |
| 2006/0218365 A1 | 9/2006 | Osaki et al. |
| 2011/0093436 A1 | 4/2011 | Zha et al. |
| 2012/0124285 A1 | 5/2012 | Soran et al. |
| 2013/0055238 A1 | 2/2013 | Lee et al. |
| 2014/0101108 A1 | 4/2014 | Stewart et al. |
| 2014/0149696 A1 | 5/2014 | Frenkel et al. |
| 2014/0188804 A1 | 7/2014 | Gokhale et al. |
| 2014/0245026 A1 | 8/2014 | Bates |
| 2015/0006835 A1 | 1/2015 | Oberhofer et al. |
| 2017/0083405 A1 | 3/2017 | Basham et al. |

OTHER PUBLICATIONS

Mell et al., "The NIST Definition of Cloud Computing," Information Page, Version 15, Oct. 7, 2009, 2 pages.

NIST, "NIST Cloud Computing Program," Information Technology Laboratory webpage, last updated Nov. 13, 2013, 3 pages.

Scriba, A., "Chapter 9: Point in Time Copies (Snapshots)," Storage Management in Data Centers, Springer-Verlag, Mar. 26, 2009.

Basham et al., U.S. Appl. No. 14/863,086, filed Sep. 23, 2015.

Non-Final Office Action from U.S. Appl. No. 14/863,086, dated Nov. 3, 2017.

Non-Final Office Action from U.S. Appl. No. 14/863,086, dated Jul. 12, 2018.

Final Office Action from U.S. Appl. No. 14/863,086, dated Jan. 28, 2019.

Notice of Allowance from U.S. Appl. No. 14/863,086, dated Oct. 17, 2019.

List of IBM Patents or Patent Applications Treated as Related.

EFFICIENT MANAGEMENT OF POINT IN TIME COPIES OF DATA IN OBJECT STORAGE BY SENDING THE POINT IN TIME COPIES, AND A DIRECTIVE FOR MANIPULATING THE POINT IN TIME COPIES, TO THE OBJECT STORAGE

BACKGROUND

The present invention relates to cloud storage, and more particularly, this invention relates to managing point in time copies of data in cloud storage systems and networks.

In the case of backup/restore and copy data management, a storage controller (e.g., a Storwize V7000, etc.) may generate an initial full backup followed by several incremental backups. The backups may be controlled via a policy, such that, for example, an incremental backup is taken every 4 hours. The initial full backup and the incremental backups may be pushed to object storage in the cloud. Over time, the amount of backup points in time stored in the cloud may grow tremendously. After a certain point (e.g., a week, etc.) it is of limited value to keep multiple point in time copies of data at 4 hour intervals. For example, it is likely unnecessary to keep 4 hour incremental backups that are more than a week old.

Additionally, the most probable scenario during a disaster recovery is to recover from the point in time nearest to production. In order to recover from a disaster, it may necessary to restore a full volume backup from the cloud, and then repeatedly apply restore points from incremental backups in the cloud until you get to the desired point in time. If a significant amount of time has passed since the initial full backup was created, then it may be time-consuming and bandwidth-intensive to download the incremental backups, and then perform many incremental restore operations after performing the full restore.

Still yet, a user may wish to delete point in time snapshots from the cloud. In order to maintain the ability to restore any point in time from the cloud, a flashcopy bitmap cascade must be preserved. Deleting flashcopy bitmaps from the middle of a bitmap chain may break the chain.

However, cloud storage provides little control over manipulating point in time snapshot copies of data generated by storage subsystems, thereby increasing the cost of, and slowing the process of, backup/recovery operations.

BRIEF SUMMARY

A computer program product, according to one embodiment, is for managing point in time copies of data in object storage. The computer program product includes a computer readable storage medium having program instructions embodied therewith. Moreover, the program instructions executable by a processor to cause the processor to: create, by the processor, point in time copies of data, and send, by the processor, the point in time copies of the data to an object storage system. A directive for manipulating the point in time copies of the data is also sent by the processor to the object storage system.

A computer-implemented method, according to another embodiment, is for managing point in time copies of data in object storage. The computer-implemented method includes: creating point in time copies of data, and sending the point in time copies of the data to an object storage system. A directive for manipulating the point in time copies of the data is also sent to the object storage system.

A computer-implemented method, according to yet another embodiment, is for managing point in time copies of data in object storage. The computer-implemented method includes: receiving, at an object storage system, point in time copies of data. A directive for manipulating the point in time copies of the data is also received at the object storage system. Moreover, in response to receiving the directive, the point in time copies of the data are manipulated at the object storage system, based on the directive.

Other aspects and embodiments of the present invention will become apparent from the following detailed description, which, when taken in conjunction with the drawings, illustrate by way of example the principles of the invention.

DETAILED DESCRIPTION

Figure 1:
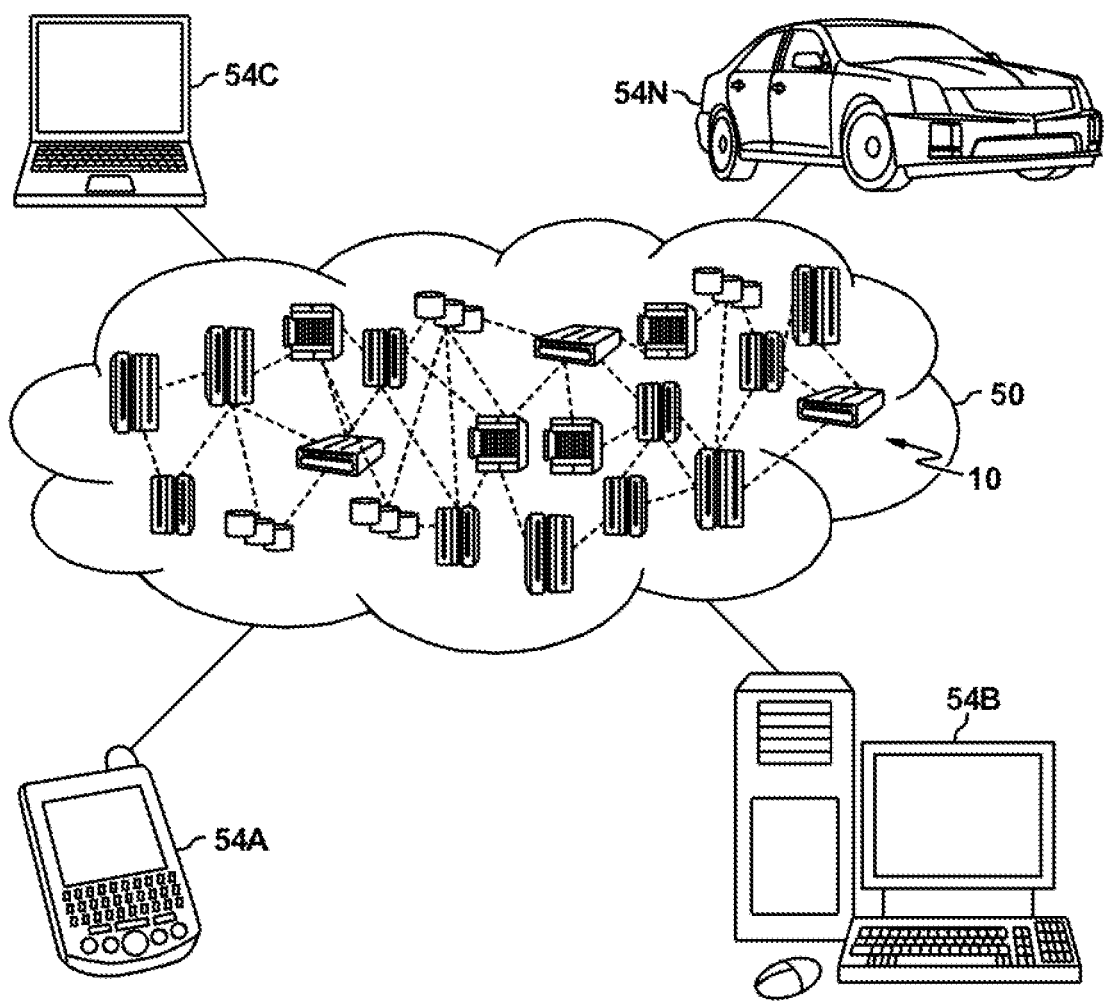
FIG. 1 depicts a cloud computing environment, according to an embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several embodiments of efficiently managing point in time copies of data in object storage.

In various embodiments, an object storage system, such as an object storage system hosted in the cloud, may eliminate the need to perform processing of point in time copies of data at an on-premises production site. For example, backup/restore operations, such as collapse, full roll forward, and delete, may be performed in the cloud, rather than within on-premises hardware. Moreover, because backup/restore operations are offloaded to the cloud, unnecessary data transfer across expensive or congested network lines may be avoided, and the execution time for various backup/restore operations may be reduced. Still yet, the object storage system may be data agnostic, and able to perform the methods disclosed herein by leveraging an object interface, such as the Open-Stack Object Store project, also referred to as OpenStack Swift.

In one general embodiment, a computer program product is provided for managing point in time copies of data in object storage. The computer program product comprises a computer readable storage medium having program instructions embodied therewith. The program instructions are executable by a processor to cause the processor to create point in time copies of data, and send the point in time copies of the data to an object storage system. Also, the program instructions are executable by the processor to cause the processor to send a directive for manipulating the point in time copies of the data.

In another general embodiment, a system is provided that comprises a memory and a processor configured for managing point in time copies of data in object storage. Managing the point in time copies of data in object storage comprises creating point in time copies of data, sending the point in time copies of the data to an object storage system, and sending, to the object storage system, a directive for manipulating the point in time copies of the data.

In another general embodiment, a computer program product is provided for managing point in time copies of data in object storage. The computer program product comprises a computer readable storage medium having program instructions embodied therewith. The program instructions are executable by an object storage system to cause the object storage system to receive point in time copies of data from a storage application. Moreover, the program instructions are executable by the object storage system to cause the object storage system to receive a directive for manipulating the point in time copies of the data, and, in response to receiving the directive, manipulate the point in time copies of the data based on the directive.

In another general embodiment, a system is provided that comprises a memory, and a processor configured for managing point in time copies of data in object storage. Managing the point in time copies of data in object storage comprises receiving, at an object storage system, point in time copies of data from a storage application. Additionally, managing the point in time copies of the data in object storage comprises receiving a directive for manipulating the point in time copies of the data, and, in response to receiving the directive, manipulating the point in time copies of the data based on the directive.

In another general embodiment, a computer-implemented method is provided that comprises receiving, at an object storage system, point in time copies of data from a storage application. The computer-implemented method further comprises receiving, at the object storage system, a directive for manipulating the point in time copies of the data, and, in response to receiving the directive, manipulating, at the object storage system, the point in time copies of the data based on the directive.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. net-works, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
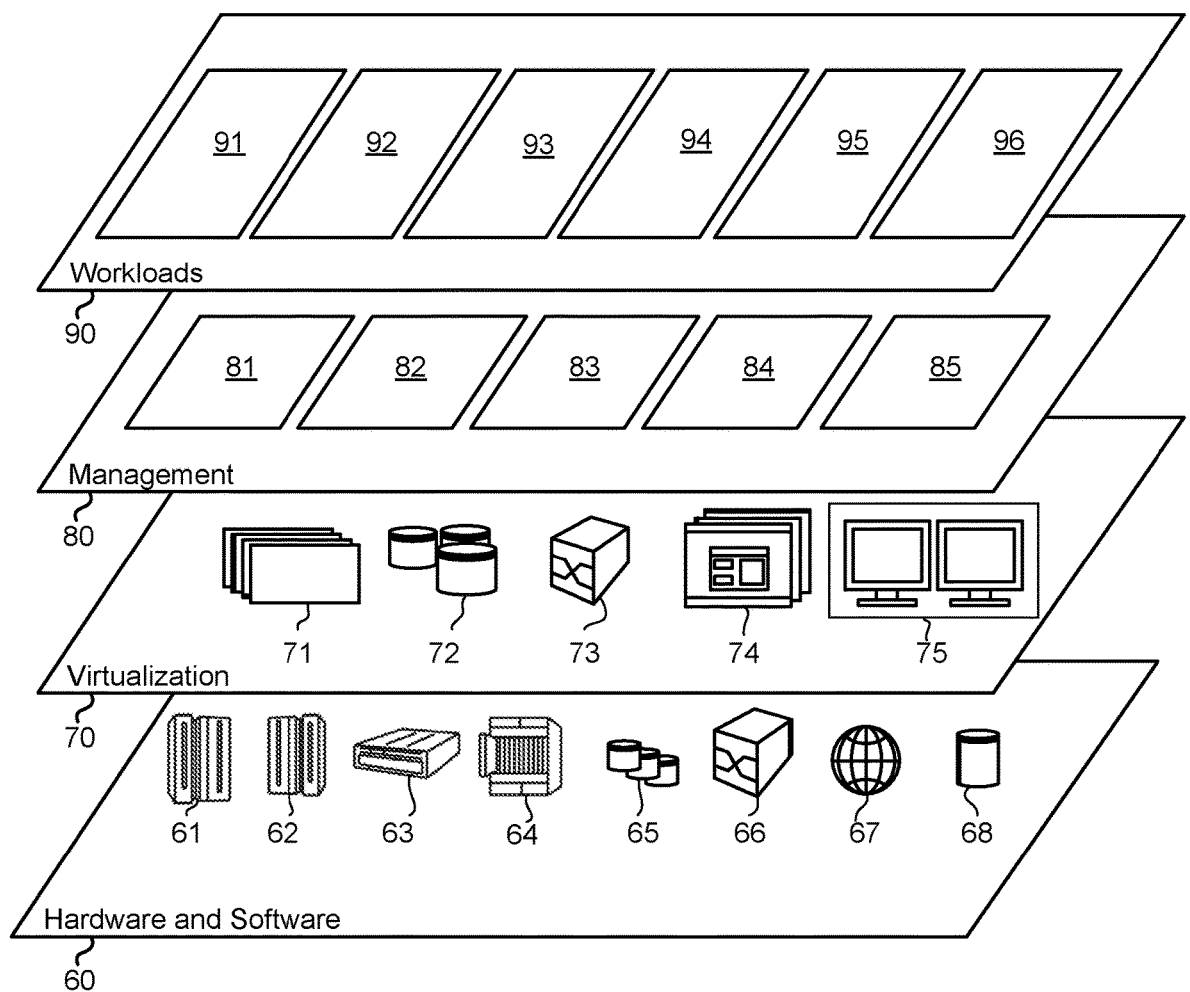
FIG. 2 depicts abstraction model layers, according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide prearrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and management of point in time copies of data in object storage 96.

Figure 3:
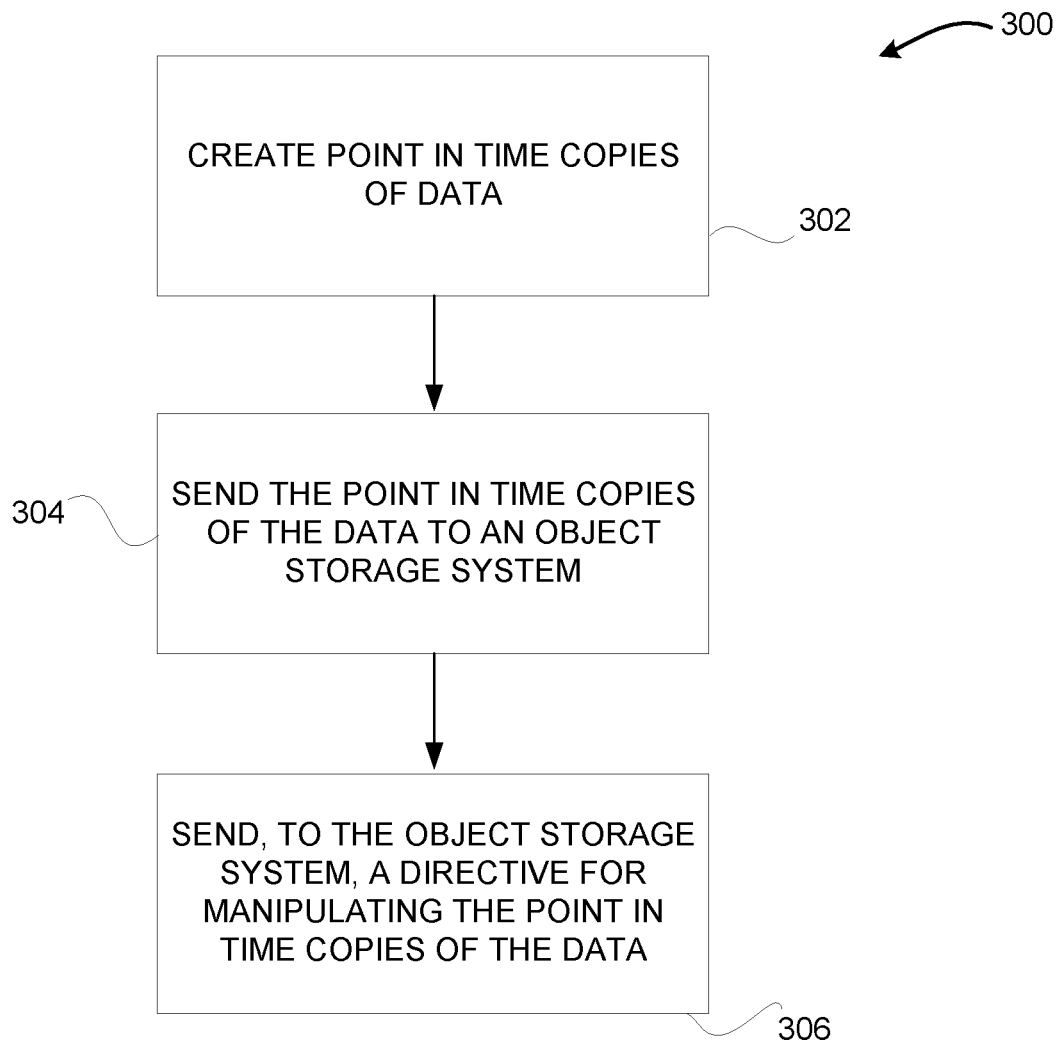
FIG. 3 depicts a method for efficiently managing point in time copies of data in object storage, in accordance with an embodiment of the present invention.

Now referring to FIG. 3, a flowchart of a method 300 for efficiently managing point in time copies of data in object storage is shown according to one embodiment. The method 300 may be performed in accordance with the present invention in any of the environments depicted in FIGS. 1-2, among others, in various embodiments. Of course, more or less operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a storage application, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 3, method 300 initiates with operation 302, where a storage application creates point in time copies of data. Additionally, at operation 304, the point in time copies of data are sent to an object storage system, such as an object storage system hosted in the cloud computing environment 50.

As used herein, the storage application may include any combination of software and hardware capable of generating a point in time copy of data on a volume. The storage application may reside within a storage controller, a storage subsystem, a virtualized storage system, etc. In some embodiments, the storage application may include products such as IBM Storwize, IBM Spectrum Virtualize, IBM DS8000, IBM XIV, IBM General Parallel File System (GPFS) Storage Server, and NetApp Snapshot, etc.

Moreover, the data may comprise any data, such as, for example, user data or system data. The point in time copies of the data may include any physical or virtual copies of a contents of the data at a given instant, and may also be referred to as snapshots of the data. As an option, the point in time copies of the data may include a full backup or snapshot of one or more volumes attached to a storage controller. Still yet, the point in time copies of the data may include an incremental backup or snapshot of one or more volumes attached to a storage controller.

In various embodiments, the point in time copies of the data may be used for backup and/or restore purposes, as a checkpoint to restore the state of an executing application, for data mining, as test data, or for off-host processing. Generation of the point in time copies may occur atomically, such that any updates performed on data are applied before or after a point in time copy of the data is created.

The point in time copies of the data may include any combination of full copies of the data and/or incremental copies of the data. In one embodiment, the point in time copies of the data may include a full copy of the data, as well as a plurality of incremental copies of the data. The full point in time copy of the data may include, for example, all data stored on a given volume. Moreover, each of the incremental point in copies of the data may include only the grains or data blocks of the given volume that have changed since the creation of the preceding point in time copy. For example, the incremental point in time copies of the data may be created every n minutes, hours, or days (e.g., 15 minutes, 30 minutes, 2 hours, 4 hours, 8 hours, 12 hours, 1 day, 2 days, 7 days, etc.).

Each grain of a given volume may comprise a unit of data (e.g., an extent, etc.) that is represented by a single bit in a point in time copy bitmap. Moreover, each grain may be mapped to an object stored at the object storage system, such that a changed grain in a point in time copy bitmap indicates that the object mapped to the grain has been changed in a point in time copy of data associated with the point in time copy bitmap. As an option, the point in time copies of the data sent to the object storage system may include, in addition to copies of data from a volume, a point in time copy bitmap for each point in time copy of the data. Each point in time copy bitmap may be stored as an object in the object storage system.

The point in time copies of the data that are created and sent to the object storage system at operations 302-304 may be created over a period of days, weeks, months, and/or years. For example, a full point in time copy of the data may be created and sent to the object storage system, and then incremental point in time copies of the data are indefinitely created and sent to the object storage system. In this manner, the object storage system may accrue hundreds or thousands of sequential point in time copies of the data.

The object storage system may comprise any entity that stores the point in time copies as object data. Moreover, the object storage system may be utilized for retrieving the point in time copies, and/or deleting the point in time copies. The object storage system may manipulate the stored object data in response to directives, such as directives from storage applications.

The object storage system may include an object storage service or an object storage platform. For example, in some embodiments, the object storage system may be an on-premises object storage system. In other embodiments, the object storage system may be hosted by a third-party Internet Service Provider (ISP) or cloud provider, such as Amazon.com or SoftLayer, such that the object storage system is in the cloud. Still yet, the object storage system may include OpenStack Swift, and/or cloud infrastructure, such as SoftLayer Cloud.

In one particular embodiment, the storage application comprises an instance of Storwize on-premises storage that creates full and incremental point in time copies of data using MCStore, and sends the point in time copies to an object storage system residing in SoftLayer of a clustered file system in the cloud, such as General Parallel File System (GPFS).

At operation 306, a directive for manipulating the point in time copies of the data is sent to the object storage system. As used herein, manipulating the point in time copies of the data includes any operation that alters, edits, or moves one or more of the point in time copies of the data. Further, the directive may include any command sent to the object storage system that instructs the object storage system to perform such operations on one or more point in time copies of the data.

As an option, manipulating the point in time copies of the data may include collapsing one or more point in time copies of the data, such that multiple point in time copies of the data, each tracking different changes to the data, are collapsed to a single point in time copy of the data. As another option, manipulating the point in time copies of the data may include rolling a full backup of the data forward in time, such that a full point in time copy of the data is updated to include changes to the data that are tracked by a plurality of incremental point in time copies of the data created after the full point in time copy was created.

Moreover, manipulating the point in time copies of the data may include deleting one or more point in time copies of the data, or reconciling one or more of the point in time copies of the data.

Thus, utilizing the directive, the storage application may rely on the object storage system for offloading the manipulation of point in time copies of data.

The directive may be communicated to the object storage system in any suitable manner. In one embodiment, the directive may be communicated to the object storage system using a Representational State Transfer Application Programming Interface (REST API). For example, the directive may be communicated to the object storage system by setting custom metadata, utilizing a REST API, for one or more containers and/or one or more objects stored in the object storage system. Such metadata may be stored as extended attributes in a file system of the object storage system, such as GPFS.

In another embodiment, the directive may be communicated to the object storage system using a document, such as an XML document. In yet another embodiment, the directive may be communicated to the object storage system using a socket interface that is separate from an object interface utilized to transfer the point in time copies to the object storage system.

In various embodiments, one or more directives may be utilized by the storage application for communicating information to the object storage system.

For example, the storage application may send a prepare directive to the object storage system when the storage application expects to receive a large data request. In response to receiving the prepare directive, the object storage system may reserve resources to timely complete the large data request, and/or to prepare data for satisfying the large data request (e.g., moving the data between tiers, caching data, clearing buffers, etc.).

Figure 4:
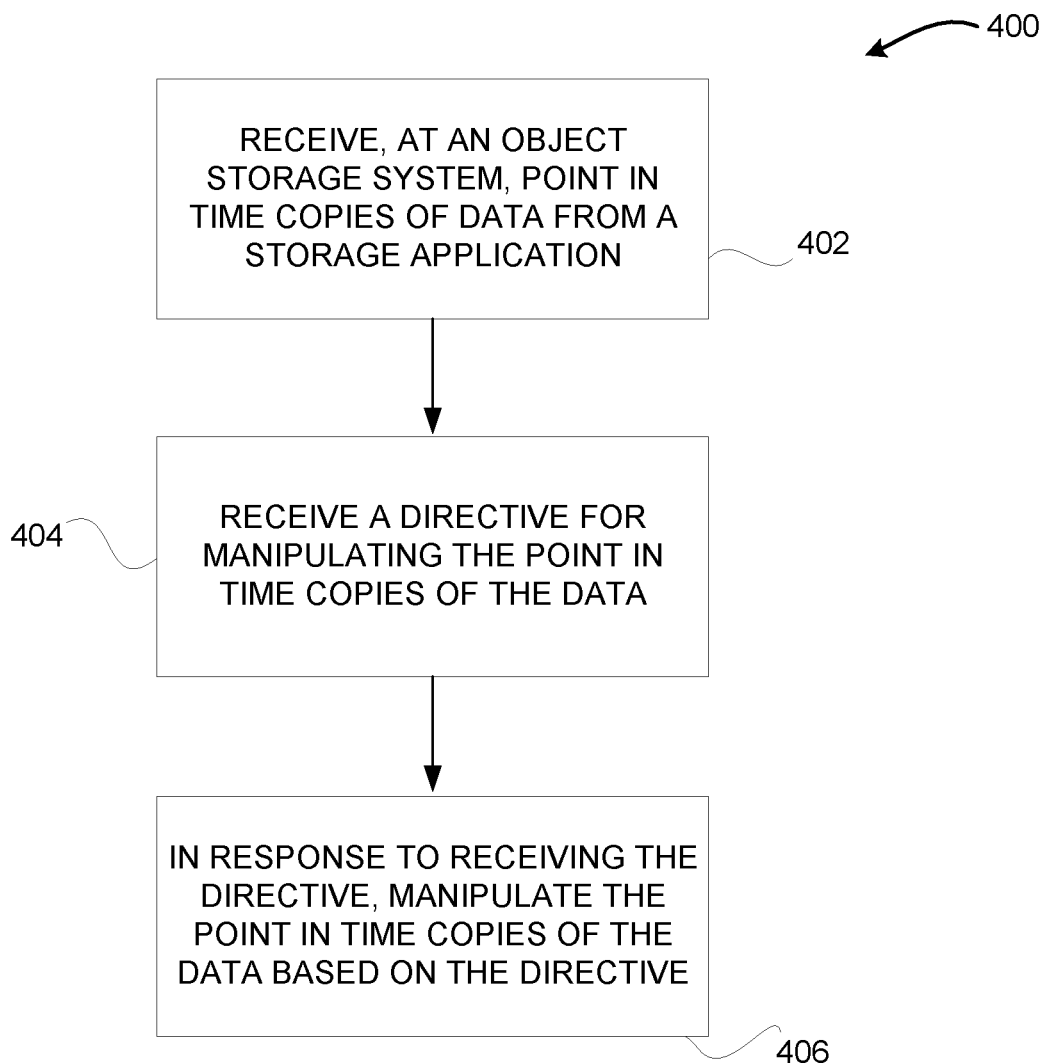
FIG. 4 depicts a method for efficiently managing point in time copies of data in object storage, according to another embodiment of the present invention.

Now referring to FIG. 4, a flowchart of a method 400 for efficiently managing point in time copies of data in object storage, is shown according to one embodiment. The method 400 may be performed in accordance with the present invention in any of the environments depicted in FIGS. 1-2, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by an object storage system, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 initiates with operation 402, where point in time copies of data are received at an object storage system. In one embodiment, the point in time copies of the data are received from a storage application.

As discussed above, the point in time copies of the data may include any physical or virtual copies of a contents of the data at a given instant, and may also be referred to as snapshots of the data. As an option, the point in time copies of the data may include a full backup or snapshot of one or more volumes attached to a storage controller. Still yet, the point in time copies of the data may include an incremental backup or snapshot of one or more volumes attached to a storage controller.

Upon receiving each point in time copy of the data, the point in time copy of the data may be stored within the object storage system as one or more objects, which may be referred to herein as point in time copy objects. An object may include any discrete unit of storage in a storage pool. Further, objects may be grouped or associated into containers, and containers may grouped or associated into accounts.

Next, at operation 404, a directive for manipulating the point in time copies of the data is received. As noted above, manipulating the point in time copies of the data includes any operation that alters, edits, or moves one or more of the point in time copies of the data. Further, the directive may include any command received at the object storage system that instructs the object storage system to perform such operations on one or more point in time copies of the data.

In one embodiment, the directive may be communicated to the object storage system using a REST API. For example, the directive may be communicated to the object storage system by setting custom metadata, utilizing a REST API, for one or more containers and/or one or more objects stored in the object storage system. In other words, the directives may be found in object/container metadata. In such an embodiment, the object storage system may extract the metadata of file system files underlying the objects, and manipulate the objects based on a directive in the metadata. Accordingly, the directives may comprise lightweight metadata updates that require little network traffic for communication.

In response to receiving the directive, the point in time copies of the data are manipulated, at operation 406, based on the directive. As described herein, any manipulation of one or more point in time copies by the object storage system may include manipulating one or more objects that the point in time copies have been stored as within the object storage system.

In some embodiments, the implementation of the object storage system may include storlets integration. By way of integrating storlets into the object storage system, functionality of the object storage system may be extended to allow code to be uploaded to the object storage system, and executed against object data without moving the object data to another location for processing. A storlet may be implemented as a single method Java interface that receives one or more point in time copy objects as input, manipulates the point in time copies within the objects according to the received directive, and then outputs one or more new point in time copy objects for storage at the object storage system.

In one embodiment, the directive may be received as a one-time invocation. For example, a point in time copy object or container, received at the object storage system from the storage application, may include metadata that indicates the point in time copy object or container must be collapsed immediately. The metadata may indicate an immediate collapse of the point in time copies using any suitable method, such as a flag in the metadata, etc. The storage application may access the metadata of a point in time copy object or container on the object storage system, and set such a flag within. In such an embodiment, the object storage system may immediately collapse the point in time copy object or container with previously received point in time copies. In this manner, the storage application may serve to actively manage and track the periodic collapse of the point in time copies.

In another embodiment, the directive may pass policy data associated with production volumes that are mapped to objects and containers in the cloud. As an option, the directive may provide a collapse policy for objects of the object storage system. For example, a collapse policy may be provided for directing the object storage system to collapse particular point in time copies. In particular, where a plurality of point in time copies of data comprise a cascaded or linked list of flash copies, storing all of the point in time copies of the data may be unnecessary and cumbersome. However, deleting any of the point in time copies may result in the deletion of backward reference pointers, thereby preventing the ability to fully restore the data from any point in time.

Thus, a collapse policy may dictate that only one point in time copy of the data is kept for each day, for each week, for each month, etc. Accordingly, two or more point in time copies of the data may be manipulated such that two or more point in time copy bitmaps that track the differences between two or more points in time are merged into an updated point in time copy bitmap, and the updated point in time copy bitmap points to the appropriate point in time copy objects on the object storage system.

Moreover, a collapse policy may control the object storage system's merging of point in time copies of data based on age (e.g., point in time copies older than n hours, point in time copies older than n weeks, point in time copies older than n months, etc.) For example, a particular collapse policy may direct the object storage system to, for a given instance of data, keep two point in time copies of the data that are older than one week, and to keep one point in time copy of the data that is older than one month, etc. Accordingly, based on such a collapse policy, any point in time copies of the data that are older than one month may be collapsed to a single point in time copy of the data, and any point in time copies of the data that are between two weeks and one month old may be collapsed to two point in time copies of the data. In this manner, the storage application may rely on the object storage system to manipulate point in time copies of data based on one or more predefined policies.

In another embodiment, the storage application providing the point in time copies of the data may send the directive with the point in time copies of the data. For example, the point in time copies of the data may be stored as objects, where the directives are attached to the objects. More specifically, an object, received at the object storage system from the storage application, may include metadata that indicates how long the point in time copy objects must be preserved without manipulation. For example, metadata may indicate that attached point in time copy objects may not be collapsed sooner than one month after receipt, etc. Accordingly, the object storage system may collapse the point in time copies based on the metadata of the objects containing the point in time copies.

As an option, the directive may instruct the object storage system to perform a collapse operation on point in time copies of the data. In response, the object storage system may merge point in time copies of the data that are stored on the object storage system as point in time copy objects. Merging the point in time copies of the data may include merging a plurality of point in time copy bitmaps, as well as merging grains of data stored as objects, thereby reducing a number of incremental point in time copies of the data stored on the object storage system.

As another option, the directive may instruct the object storage system to perform a full roll forward operation on point in time copies of the data. In response, the object storage system may rearrange point in time copies of the data that are stored on the object storage system as point in time copy objects. Rearranging the point in time copies of the data may include rearranging a plurality of point in time copy bitmaps, as well as changed grains to create a full point in time copy of a production volume at a point in time that is temporally closer or more current to the current production volume than a previously stored full point in time copy of the volume. Moreover, the object storage system may update downstream (older in time) point in time copy bitmaps and changed grains in order to preserve additional point in time copies of the production volume.

In the event of a failure of the production volume, the new full point in time copy of the production volume—which was generated by the object storage system performing the full roll forward operation on point in time copies of the data—may be downloaded from the object storage system and utilized for a restore operation. Accordingly, by instructing the object storage system to perform the full roll forward operation, the storage application may avoid the time-consuming and bandwidth-intensive process of downloading and recursively applying a number of incremental point in time copies of data.

As yet another option, the directive may instruct the object storage system to perform a delete operation on point in time copies of the data. In response, the object storage system may delete point in time copies of the data that are stored on the object storage system as point in time copy objects. Deleting the point in time copies of the data may include rearranging a plurality of point in time copy bitmaps, and changed grains associated with a break in a point in time copy chain, such that a contiguous cascade of point in time copy objects and containers may be maintained in the object storage system.

Moreover, a directive from the storage application may instruct the object storage system to reconcile a contents of the object storage system with the storage application. For example, where an object storage system has temporarily lost connectivity during an operation (e.g., a collapse operation including changed grains, etc.), then when connectivity is restored a contents of the object storage system may be different than expected by the storage application. Accordingly, the storage application may command the object storage system to reconcile a contents of the object storage system with logic of the storage application.

In some embodiments, a directive from the storage application may instruct the object storage system that a volume restore is anticipated. In response, the object storage system may perform maintenance on the point in time copies for the volume to ensure that the restore proceeds in an optimal manner. For example, the object storage system may perform a full roll forward operation on point in time copies of data for the volume such that a nearest point in time production copy of the volume is generated. In this manner, the object storage system may minimize the network bandwidth utilized for the restore operation, as well as ensure that the production volume is rapidly returned to the nearest point in time operating state.

Still yet, in some embodiments, a directive from the storage application may instruct the object storage system to provide feedback regarding the status of an operation (e.g., a collapse operation, a full roll forward operation, a delete operation, etc.). Operations offloaded for performance to the object storage system may not complete immediately. Further, because the object storage system may be remote from the storage application, the storage application may not readily obtain a status of such operations. Accordingly, a feedback directive may instruct the object storage system to return a status an operation being performed based on a previously sent directive.

For example, after the storage application has directed the object storage system to perform a collapse of multiple point in time copies, the storage application may follow up with a feedback directive. In response to the feedback directive, the object storage system may return to the storage application a progress of the collapse operation, and/or an estimated completion time of the collapse operation.

As another option, a directive received at the object storage system from the storage application may include a scheduling directive. The scheduling directive may identify when the storage application runs jobs (i.e., creates point in time copies, and sends the point in time copies to the object storage system, etc.). The object storage system may utilize such scheduling directives from one or more storage applications to predict periods of low or idle processing, and/or reduced bandwidth usage. The object storage system may schedule for execution maintenance operations, collapse operations, full roll forward operations, etc. during the expected relatively idle or reduced-usage time periods. In this manner, resources of the object storage system may be more efficiently used by shifting the timing of manipulation operations to occur during otherwise idle time periods.

In some embodiments, the object storage system may keep a historical record of when point in time copies are received from one or more storage applications. Because the storage applications generating and sending the point in time copies are likely to generate the point in time copies as part of regularly scheduled operations (e.g., routine backup operations, etc.), the object storage system may utilize the historical record to perform heuristics and predict the idle time periods. The object storage system may schedule for execution maintenance operations, collapse operations, full roll forward operations, etc., during the relatively idle or reduced-usage time periods that have been heuristically predicted.

Accordingly, as set forth above, an object storage system, such as an object storage system hosted in the cloud, may eliminate the need to perform processing of point in time copies of data at an on-premises production site. For example, backup/restore operations, such as collapse, full roll forward, and delete, may be performed in the cloud, rather than within on-premises hardware. Moreover, because backup/restore operations are offloaded to the cloud, unnecessary data transfer across expensive or congested network lines may be avoided, and the execution time for various backup/restore operations may be reduced. Still yet, the object storage system may be data agnostic, and able to perform the methods disclosed herein by leveraging an object interface, such as the OpenStack Object Store project, also referred to as OpenStack Swift.

As an example, consider a prior art system where a storage application is creating point in time copies of a 1 TB volume 14 times each day, and sending each of the point in time copies to a cloud object storage system. In order to perform a collapse operation, roll full forward operation, delete operation, prune operation, etc., point in time copy bitmaps and incremental change blocks would need to be retrieved from the cloud, combined, and rewritten to the could. Even at a 5% change rate, this may include reading approximately 50 GB from the cloud for each incremental backup, or 700 GB in total over the course of 14 daily backups. Reading the data may take hours on its own, not including performing any of the aforementioned operations. Still yet, such operations may incur significant costs if reads from the cloud are billed based on the amount of data transferred.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product for managing point in time copies of data in object storage, the computer program product comprising a computer readable storage medium having program instructions embodied therewith, the program instructions executable by a processor to cause the processor to:
    create, by the processor, point in time copies of data;
    send, by the processor, the point in time copies of the data to an object storage system; and
    send, by the processor to the object storage system, a directive for manipulating the point in time copies of the data.

2. The computer program product as recited in claim 1, wherein the point in time copies of the data include a full backup of a volume.

3. The computer program product as recited in claim 2, wherein the point in time copies of the data include one or more incremental backups of the volume.

4. The computer program product as recited in claim 3, wherein the point in time copies of the data include a point in time copy bitmap for each point in time copy of the data.

5. The computer program product as recited in claim 4, wherein the directive sent to the object storage system includes a collapse directive and/or a delete directive.

6. The computer program product as recited in claim 4, wherein the directive sent to the object storage system is communicated to the object storage system using a Representational State Transfer Application Programming Interface (REST API), and/or a socket interface.

7. A computer-implemented method for managing point in time copies of data in object storage, the computer-implemented method comprising:
    creating point in time copies of data;
    sending the point in time copies of the data to an object storage system; and
    sending, to the object storage system, a directive for manipulating the point in time copies of the data.

8. The computer-implemented method as recited in claim 7, wherein the point in time copies of the data include a full backup of a volume, wherein the point in time copies of the data include one or more incremental backups of the volume.

9. The computer-implemented method as recited in claim 8, wherein the directive sent to the object storage system includes a collapse directive, wherein the collapse directive includes one or more instructions to collapse two or more of the point in time copies sent to the object storage system into a single point in time copy of the data.

10. The computer-implemented method as recited in claim 8, wherein the point in time copies of the data include a point in time copy bitmap for each point in time copy of the data.

11. The computer-implemented method as recited in claim 10, wherein the directive sent to the object storage system includes a full roll forward directive and/or a delete directive.

12. The computer-implemented method as recited in claim 10, wherein the directive sent to the object storage system is communicated to the object storage system using at least one medium selected from the group consisting of: a Representational State Transfer Application Programming Interface (REST API), a document, and a socket interface, wherein the sending the point in time copies and the sending the directive improves performance of the system by reducing throughput of the system and reducing network traffic.

13. A computer-implemented method for managing point in time copies of data in object storage, the computer-implemented method comprising:
    receiving, at an object storage system, point in time copies of data;
    receiving, at the object storage system, a directive for manipulating the point in time copies of the data; and
    in response to receiving the directive, manipulating, at the object storage system, the point in time copies of the data based on the directive.

14. The computer-implemented method as recited in claim 13, wherein manipulating the point in time copies of the data based on the directive includes:
   inputting the point in time copies into a storlet;
   using the storlet to manipulate the point in time copies according to the received directive; and
   storing one or more new point in time copies, formed by the manipulating, in the object storage system.

15. The computer-implemented method as recited in claim 13, wherein the point in time copies of the data include a full backup of a volume, wherein the point in time copies of the data include one or more incremental backups of the volume.

16. The computer-implemented method as recited in claim 15, comprising:
   receiving a prepare directive; and
   in response to receiving the prepare directive, reserving computing resources and/or preparing data which corresponds to the received prepare directive, wherein preparing the data which corresponds to the received prepare directive includes performing one or more operations selected from the group consisting of: transitioning at least a portion of the data between tiers of memory, storing at least a portion of the data in cache, and clearing one or more buffers.

17. The computer-implemented method as recited in claim 15, wherein the point in time copies of the data include a point in time copy bitmap for each point in time copy of the data.

18. The computer-implemented method as recited in claim 17, wherein the received directive includes one or more directives selected from the group consisting of: a collapse directive, a full roll forward directive, and a delete directive.

19. The computer-implemented method as recited in claim 17, wherein the point in time copies of the data are manipulated by a storlet on the object storage system.

* * * * *